W. P. PARSONS.
LATHE CHUCK JAWS.
APPLICATION FILED MAR. 14, 1916.
1,224,780.
Patented May 1, 1917.
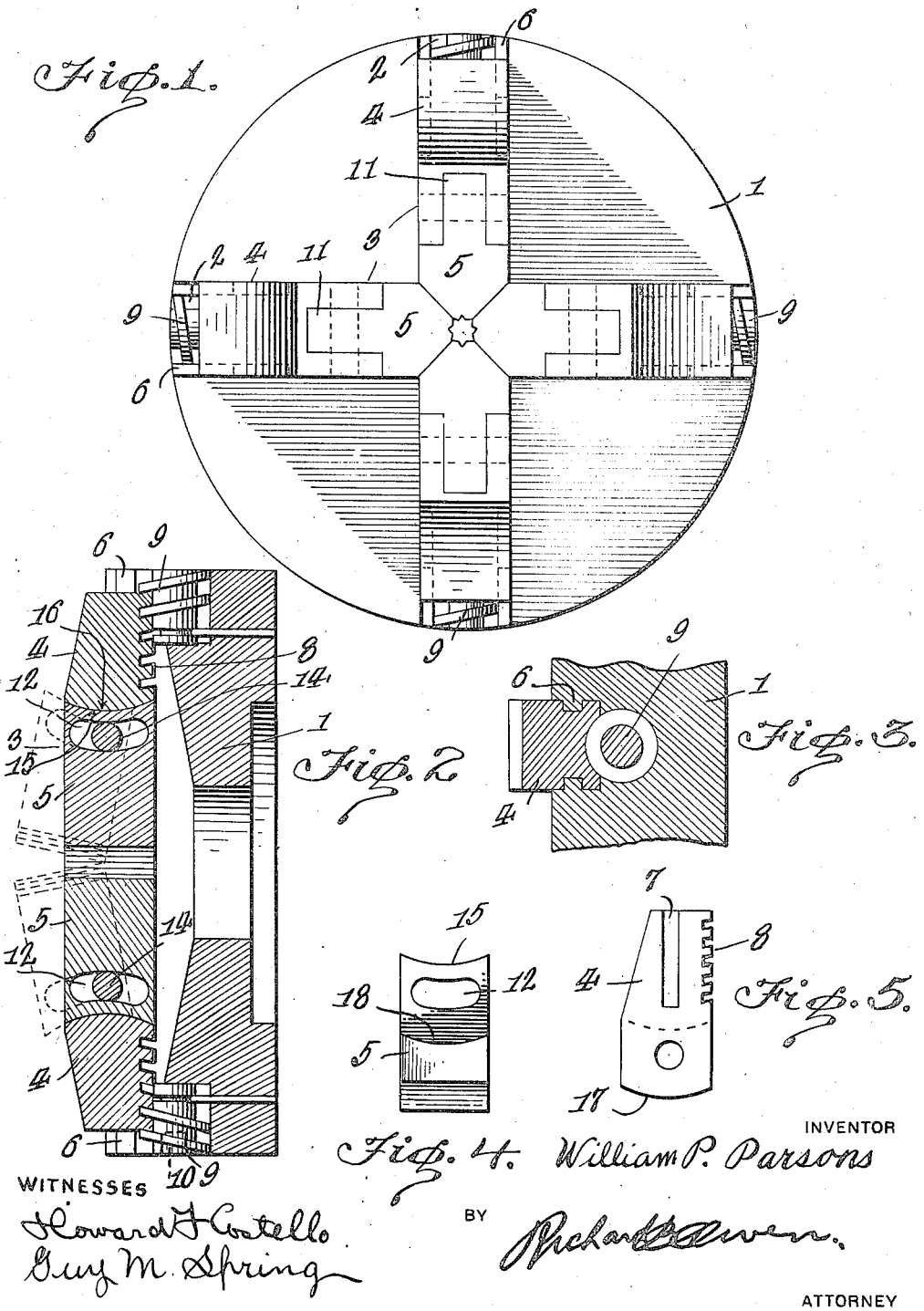
INVENTOR
William P. Parsons
WITNESSES

UNITED STATES PATENT OFFICE.

WILLIAM P. PARSONS, OF CORNING, NEW YORK.

LATHE-CHUCK JAWS.

1,224,780.  Specification of Letters Patent.  Patented May 1, 1917.

Application filed March 14, 1916. Serial No. 84,153.

*To all whom it may concern:*

Be it known that I, WILLIAM P. PARSONS, a citizen of the United States, residing at Corning, in the county of Steuben and State of New York, have invented certain new and useful Improvements in Lathe-Chuck Jaws, of which the following is a specification.

My invention relates to an improvement in lathe chuck jaws, and more particularly to a chuck jaw adapted to be used to hold taper stock. Heretofore, it has been impossible, by reason of the construction of chuck jaws, to obtain a full bearing of the jaw upon taper stock, therefore, it is an object of this invention to provide a chuck jaw wherein this difficulty will be entirely obviated.

A further object is to provide a chuck jaw comprising an outer section and an inner section, said outer section being mounted for the usual sliding movement in the chuck body and adjusted by the usual screws provided therefor, the inner section being pivotally connected to the outer section and being movable in the arc of a circle, so as to adjust itself to the conformation of the taper stock, whereby a full bearing may be obtained upon the same.

I attain these and other objects by means of the construction and combination of the various parts as will be hereinafter more fully described and pointed out in the appended claims.

In the drawings:

Figure 1 is a front elevation of a chuck body showing my improved chuck jaws mounted therein.

Fig. 2 is a section on the line 2—2 of Fig. 1.

Fig. 3 is a detail section showing the manner of mounting the jaw in the chuck body.

Fig. 4 is a detail view of the inner or movable section of the chuck jaw.

Fig. 5 is a detail view of the outer section of the chuck jaw which is engaged by the adjusting screws.

The numeral 1 designates the customary carrier or body of a lathe chuck which is provided with the usual radial slots 2 for the reception of the chuck jaws 3, each of said jaws consisting of connected sections 4 and 5. The outer jaw section 4 is mounted in the usual adjustable manner in the radial slots 2 of the body or carrier 1 through the medium of the slide ways 6 which are adapted to engage the slots 7 provided in the jaw section for the reception thereof, and the usual screw threaded inner face 8 adapted to engage the customary adjusting screws 9, said screws being provided with a squared socket to receive an adjusting tool.

The inner jaw section 5 is provided with a tongue portion 11 extending the full width thereof having an arcuate slot 12 formed adjacent the end thereof, the said tongue adapted to fit into a groove 13 provided in the outer jaw section 4 and removably secured therein by means of the pin 14 carried by the outer jaw section and extending through the slot 12. Upon inspection of the drawing, it will be noted, that the tongue 11 is provided with an arcuate surface 15 adapted to coact with an arcuate surface 16 of the outer jaw section 4, and furthermore that the sides of the outer jaw section 4 are also provided with arcuate surfaces 17 adapted to coact with the arcuate surfaces 18 formed on the inner jaw section 5, at either side of the tongue 11, said arcuate surfaces being concentric with the slot 12, whereby the inner jaw section 5 is movable in the arc of a circle with relation to the outer jaw section 4, the movement of said inner jaw being limited by the size of the slot 12.

In operation, when it is desired to hold taper stock, the jaws are adjusted in the usual manner to receive the same, whereupon the movable inner sections 5 are adjusted to conform to the degree of taper of the stock to be held, whereby when the adjusting screws 9 are actuated to move the chuck jaws inwardly to grip the stock, a full bearing of the stock engaging surfaces 3' of the chuck jaw will be obtained upon said stock. It will also be observed that the inner jaws 5 being movable in the arc of a circle are adapted, if desired, to give a full bearing on stock tapering in either direction.

While from the foregoing description taken in connection with the drawings, it will be seen that I have provided a device clearly operable and efficient for the purpose described, I do not claim the exact construction illustrated therein, but reserve the right to make certain minor changes and alterations as will not depart from the spirit and scope of the appended claims.

I claim:

1. In a device of the class described, a body comprising a section having a slot therein, a second section having a tongue thereon engaging the slot, said tongue having an arcuate slot therein and a pin passing entirely through the first section and through said slot, both of said sections having coacting arcuate surfaces that contact with each other.

2. The combination with the body of a chuck having radial slots in its front face, of jaws mounted in said slots, means to adjust the jaws, each of said jaws comprising an inner section and an outer section, means carried by the outer of said sections to engage the adjusting means, a tongue and groove connection between the sections, a curved slot in the tongue, a pin passing entirely through the first section and through said slot, said sections having coacting curved surfaces where they contact with each other and the chuck face having an inner cut away portion below the jaws to permit movement of the inner sections.

In testimony whereof I affix my signature in presence of two witnesses.

WILLIAM P. PARSONS.

Witnesses:
F. F. Pfeiffer,
J. J. O'Brien.